(12) United States Patent  (10) Patent No.: US 8,957,868 B2
Zhu et al.  (45) Date of Patent: Feb. 17, 2015

(54) MULTI-TOUCH TEXT INPUT

(75) Inventors: Bin Benjamin Zhu, Edina, MN (US); Maowei Yang, Sichuan (CN); Xuyong Yang, Sichuan (CN); Shipeng Li, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 370 days.

(21) Appl. No.: 13/152,272

(22) Filed: Jun. 3, 2011

(65) Prior Publication Data

US 2012/0306769 A1  Dec. 6, 2012

(51) Int. Cl.
 *G09G 3/30* (2006.01)
 *G06F 3/0488* (2013.01)

(52) U.S. Cl.
 CPC ........ *G06F 3/04883* (2013.01); *G06F 3/04886* (2013.01); *G06F 2203/04808* (2013.01)
 USPC ........................................................ 345/173

(58) Field of Classification Search
 USPC .................................. 345/173–179
 See application file for complete search history.

(56) References Cited

U.S. PATENT DOCUMENTS

| | | | | |
|---|---|---|---|---|
| 6,107,997 | A | 8/2000 | Ure | |
| 6,456,952 | B1 * | 9/2002 | Nathan | 702/94 |
| 7,352,363 | B2 * | 4/2008 | Coates et al. | 345/169 |
| 8,023,700 | B2 * | 9/2011 | Riionheimo | 382/116 |
| 2007/0040813 | A1 * | 2/2007 | Kushler et al. | 345/173 |
| 2008/0042979 | A1 | 2/2008 | Nikbin | |
| 2008/0291171 | A1 * | 11/2008 | Shin et al. | 345/168 |
| 2008/0316183 | A1 | 12/2008 | Westerman et al. | |
| 2009/0249258 | A1 | 10/2009 | Tang | |
| 2010/0020033 | A1 | 1/2010 | Nwosu | |
| 2010/0148995 | A1 | 6/2010 | Elias | |
| 2011/0012716 | A1 | 1/2011 | Miller, IV | |
| 2011/0302518 | A1 * | 12/2011 | Zhang | 715/773 |

OTHER PUBLICATIONS

Perino, Nicoló, "Technologies and Architectures for Multi-Touch Interaction", Retrieved at <<http://www.people.usi.ch/perinon/contents/pdf/Technologies_and_Architectures_for_Multi-Touch_Interaction.pdf>>, 2009, pp. 10.

"Instant Text—Textware Solutions", Retrieved at <<http://www.fitaly.com/>>, Retrieved Date: Feb. 1, 2011, p. 1.

Mitchell, Robert L. "Will Touch Screens Kill the Keyboard", Retrieved at <<http://www.computerworld.com/s/article/9202298/Will_touch_screens_kill_the_keyboard_>>, Jan. 6, 2011, pp. 5.

(Continued)

*Primary Examiner* — Robin Mishler
(74) *Attorney, Agent, or Firm* — Dan Choi; Judy Yee; Micky Minhas

(57) ABSTRACT

This document describes tools associated with symbol entry control functions. In some implementations, the tools identify a first finger that is in tactile contact with a touch screen. The first finger can select a subset of symbols from a plurality of symbols that can be entered via the touch screen. The tools can also identify whether one or more other fingers are in concurrent tactile contact with the first finger on the touch screen. The tools can select an individual symbol from the subset based on whether the one or more other fingers are in concurrent tactile contact with the first finger on the touch screen.

20 Claims, 9 Drawing Sheets

(56) References Cited

OTHER PUBLICATIONS

Kristensson, et al., "Command Strokes with and without Preview: Using Pen Gestures on Keyboard for Command Selection", Retrieved at <<http://www.pokristensson.com/pubs/KristenssonZhaiCHI2007a.pdf>>, In the Proceedings of the SIGCHI conference on Human factors in computing systems, Apr. 28-May 3, 2007, pp. 1137-1146.

Kristensson, et al., "SHARK2: A Large Vocabulary Shorthand Writing System for Pen-based Computers", Retrieved at <<http://pokristensson.com/pubs/KristenssonZhaiUIST2004.pdf>>, In the Proceedings of the 17th annual ACM symposium on User interface software and technology, vol. 6, Issue 2, Oct. 24-27, 2004, pp. 43-52.

Zhai, et al., "Performance Optimization of Virtual Keyboards", Retrieved at <<http://74.125.155.132/scholar?q=cache:kHxYfsu3Du4J:scholar.google.com/&hl=en&as_sdt=0,5>>, 2002, pp. 44.

Zhai, et al., "Shorthand Writing on Stylus Keyboard", Retrieved at <<http://www.iliask.com/842/ReadingsMarch16/ZhaiKristenssonCHI2003.pdf>>, In the Proceedings of the SIGCHI conference on Human factors in computing systems, Apr. 5-10, 2003, pp. 8.

\* cited by examiner (drag index finger down)

(drag index finger down)

(swirl index finger clockwise)

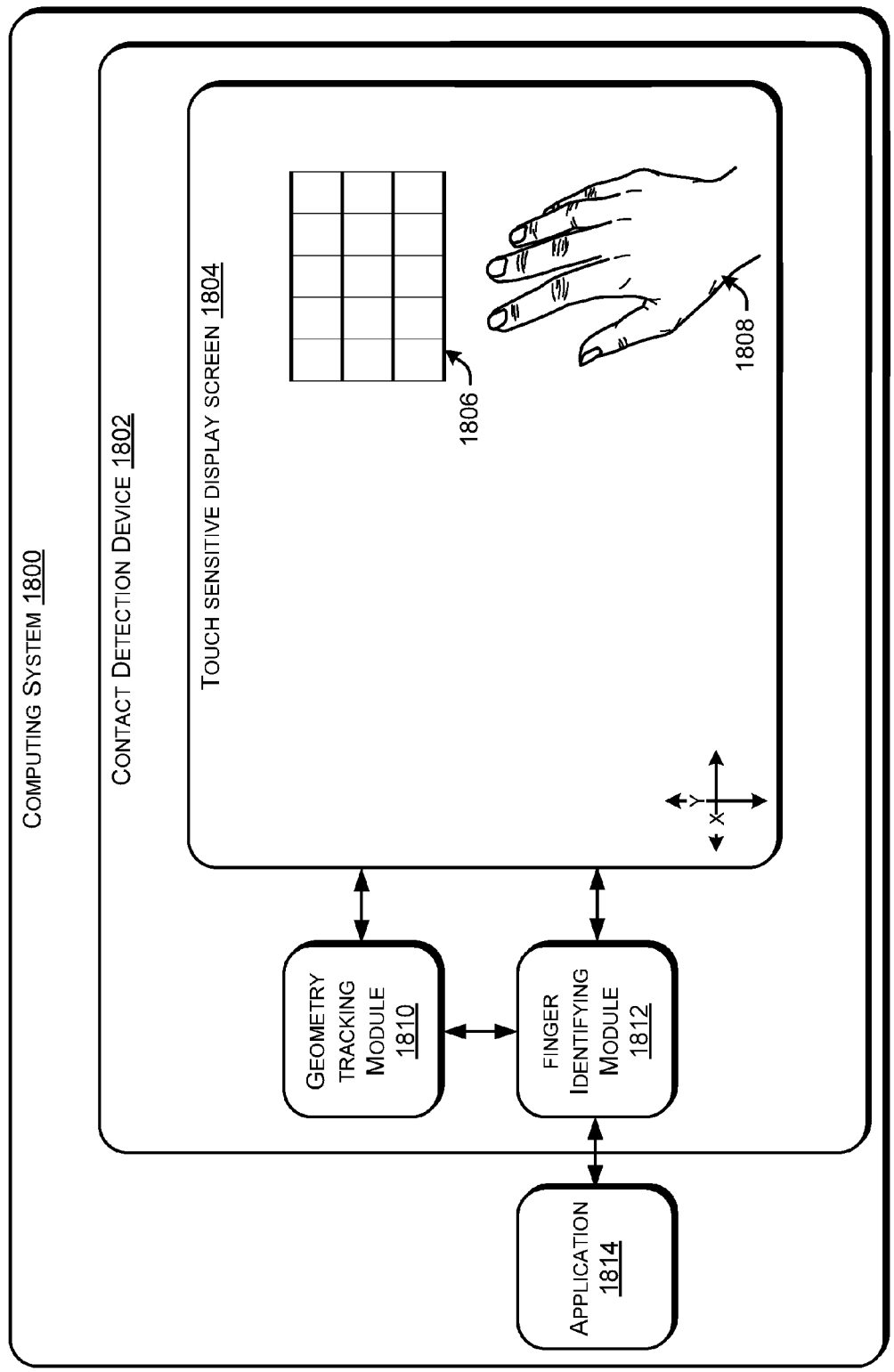

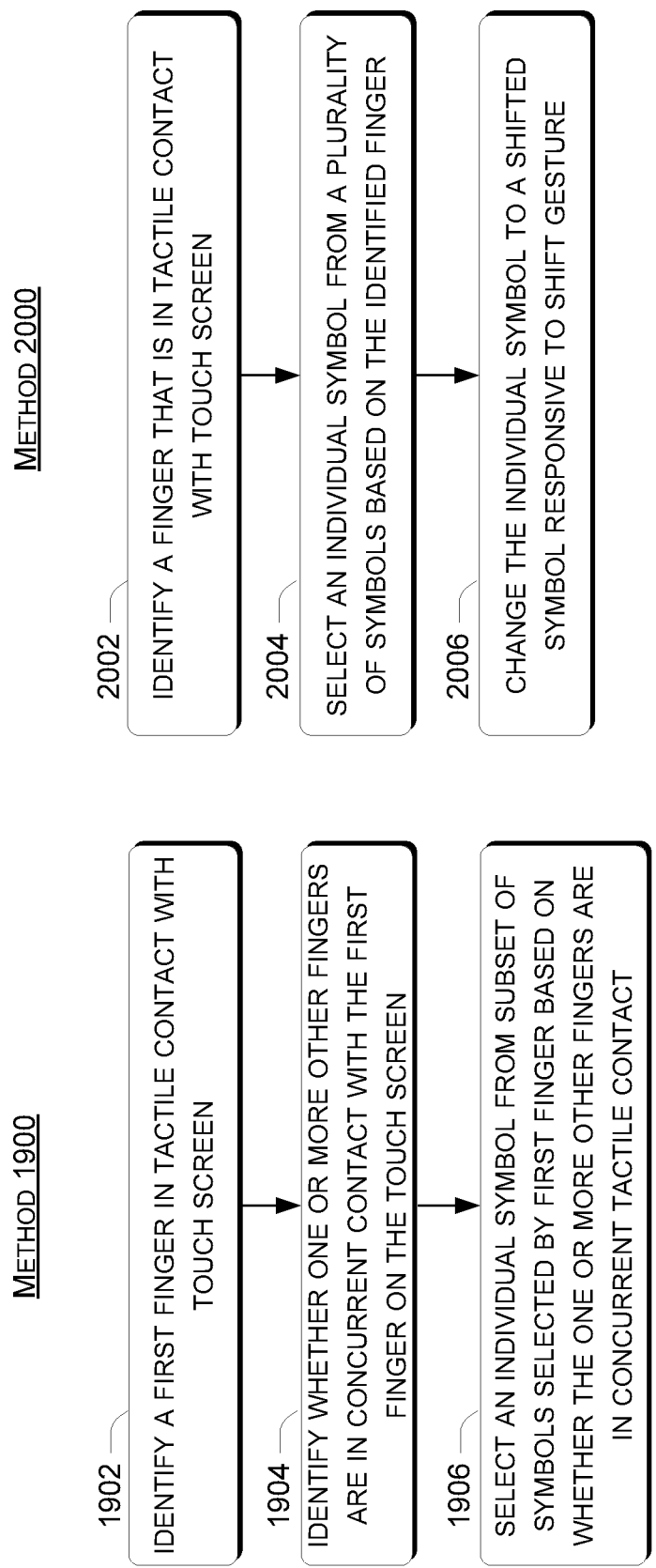

MULTI-TOUCH TEXT INPUT

BACKGROUND

Touch screen devices can provide a number of advantages for users. For example, touch screens can allow using smaller form factors for electronic devices by eliminating separate input devices such as keyboards and mice. In some touch screen devices, "soft" keyboards can be used for text entry in place of a traditional keyboard. However, such soft keyboards often do not allow for efficient text entry by users. For example, users may be trained in how to type efficiently on a full-sized keyboard, but may have more difficulties on soft keyboards.

Moreover, in many cases, soft keyboards are reduced in size to fit smaller form-factor devices such as cell phones, personal digital assistants (PDAs), tablets, netbooks, etc. Such reduced-size keyboards may require relatively complex or counterintuitive actions on the part of the user to enter a single letter or other symbol. The present concepts offer enhanced usability and efficiency for symbolic input using a touch screen.

SUMMARY

This document describes tools associated with symbol entry functions. In some implementations, the tools identify a first finger that is in tactile contact with a touch screen. The first finger can select a subset of symbols from a plurality of symbols that can be entered via the touch screen. The tools can also identify whether one or more other fingers are in concurrent tactile contact with the first finger on the touch screen. The tools can also select an individual symbol from the subset based on whether the one or more other fingers are in concurrent tactile contact with the first finger on the touch screen.

The disclosed implementations also provide a tool that can include a touch screen, a finger identifying module, and one or more processing devices that are configured to execute the finger identifying module. The finger identifying module can be configured to identify a first finger that is in tactile contact with the touch screen. The first finger can select a subset of symbols from a plurality of symbols that can be entered via the touch screen. The finger identifying module can also be configured to identify whether one or more other fingers are in tactile contact on the touch screen with first finger on the touch screen or a relative order in which the one or more other fingers tactilely contact the touch screen, and configured to select an individual symbol from the subset based on at least whether the one or more other fingers are in tactile contact or the relative order.

The disclosed implementations also provide a technique that can include identifying a finger that is in tactile contact with a touch screen. The technique can also include selecting an individual symbol from a plurality of symbols based on the identified finger, and changing the individual symbol to a corresponding shifted symbol responsive to a shift gesture received after the individual symbol is selected.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "tools," for instance, may refer to system(s), method(s), computer-readable instructions (e.g., one or more computer-readable storage media having executable instructions), components, and/or technique(s) as permitted by the context above and throughout this document.

BRIEF DESCRIPTION OF THE DRAWINGS

The detailed description is described with reference to the accompanying figures. In the figures, the left-most digit(s) of a reference number identifies the figure in which the reference number first appears. The use of similar reference numbers in different instances in the description and the figures may indicate similar or identical items.

FIG. 18 is an illustration of an example environment employing symbol entry control.

FIGS. 19 and 20 are flow diagrams of methods in accordance with some implementations.

DETAILED DESCRIPTION

Overview

More and more, computing systems are sold with touch screens. Touch screens accept user input based on physical contact, such as tactile contact from one or more stylus or finger contacts, with one or more contact detectors included in the touch screen. For example, contact detectors can use resistive, capacitive, optical, and/or mechanical technologies to detect the locations of tactile contacts. Current touch screens, however, may not allow for efficient input of text by a user. For instance, some existing technologies make the user go through multiple cumbersome steps to enter a single symbol.

Other existing technologies can require the user to correctly locate their fingers within predetermined areas on the device, and do not flexibly adapt if the position of the user's fingers changes as they type. For example, the user may need to contact keys on a soft keyboard to enter a particular letter. Because the keys may cover relatively small areas, the user may accidentally contact an adjacent key instead of the key they intend to contact.

Example Screenshots

FIGS. 1-17 illustrate exemplary manifestations of the symbol entry concepts described in this document. In some implementations, users can select a group or subset of one or more symbols by touching a touch screen with a single finger. Then, users can select individual symbols in the group or subset for entry by concurrently touching the touch screen with additional fingers. For example, a user can select the second symbol in the group or subset by touching the touch screen with a second finger, and can select the third symbol in the group or subset by touching the touch screen with a third finger. Note that numbers, letters, and other symbols are referred to herein collectively as "symbols."

Figure 1:
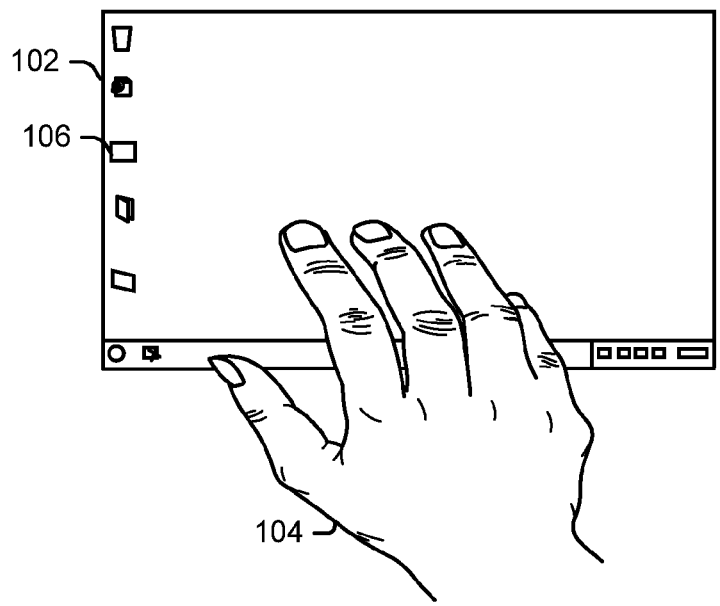
FIGS. 1-17 are exemplary screenshots depicting symbol entry control concepts in accordance with some implementations.
Figure 2:
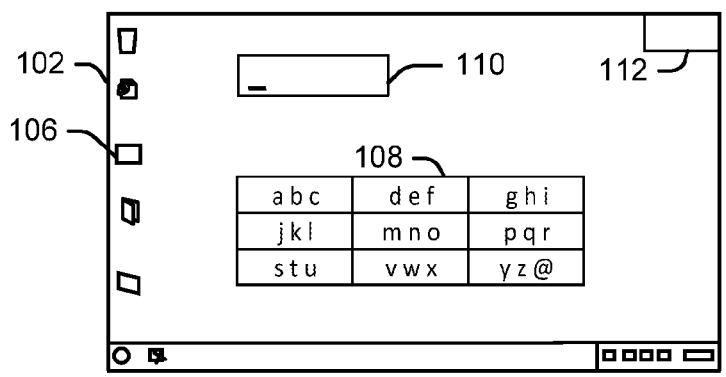

FIGS. 1 and 2 collectively illustrate a first symbol entry launch implementation via screenshots of a touch screen 102. In FIG. 1, a user's hand 104 is proximate to touch screen 102. The user can activate a text entry launch button 106 by contacting touch screen 102 with their hand at the location of text entry launch button 106. Text entry launch button 106 can also be implemented as a physical button, e.g., on the side of a device that includes touch screen 102.

FIG. 2 illustrates touch screen 102 responsive to the activation of text entry launch button 106. A first symbol entry block such as an alphabet text entry block 108 is now displayed on touch screen 102, as well as an entered text box 110 and a hint block 112. In this case, alphabet text entry block 108 includes nine individual cells which each include a group of three letters of the alphabet, e.g., "a b c," "d e f," etc. Note the last cell of alphabet text entry block 108 includes the letters y and z as well as the "@" symbol. Entered text box 110 is shown with a cursor "_" to indicate where the next symbol selected by the user will be entered. As discussed in more detail below, hint block 112 can guide the user by indicating what letter the user will enter given the current configuration of their fingers on touch screen 102. In some implementations, hint block 112 is omitted for experienced and/or proficient users.

In the examples discussed herein, the nine individual cells of alphabet text entry block 108 can include columns which correspond to three fingers, for example, an index finger, a middle finger, and a ring finger. The nine individual cells can be organized into rows at three position layers, e.g., top, middle, and bottom layers. Thus, the three cells in the leftmost column correspond to an index finger at top, middle, and bottom layers. The middle column corresponds to the positions of three layers for the user's middle finger, and the right column corresponds to the positions of three layers of the user's ring finger.

Figure 3:
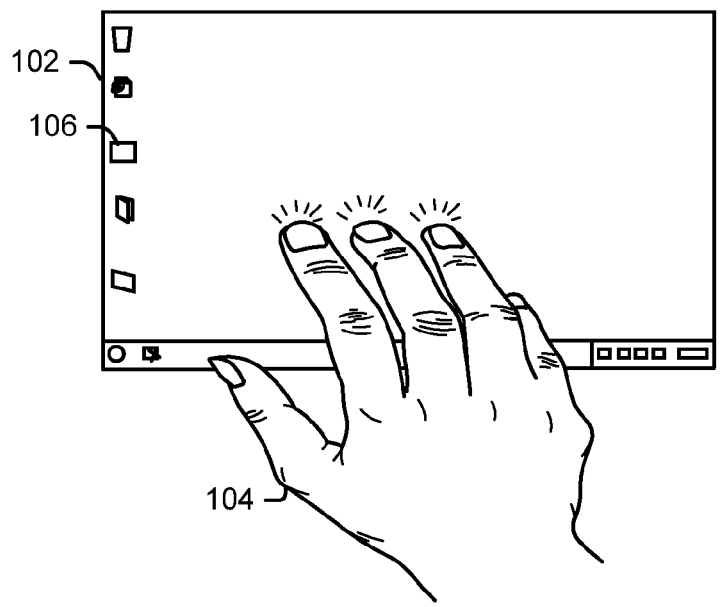

FIG. 3 illustrates a second symbol entry launch implementation. As mentioned above, the user can initiate the display of alphabet text entry block 108 and/or entered text box 110 by pressing text entry launch button 106. However, in some implementations, touch screen 102 can display alphabet text entry block 108 responsive to a "launch gesture" provided by the user. For example, as shown in FIG. 3, the user can provide three points of tactile contact relatively simultaneously, e.g., by touching the screen with their index, middle, and ring fingers. In some implementations, such a launch gesture is used in place of, or as an alternative to, text entry launch button 106 for launching alphabet text entry block 108 and/or entered text box 110. Note also that, for the purposes of illustration, fingers in contact with touch screen 102 are distinguished by a surrounding "burst" pattern as shown in FIG. 3. Fingers not in contact with touch screen 102 are not shown with the burst pattern.

Figure 4:
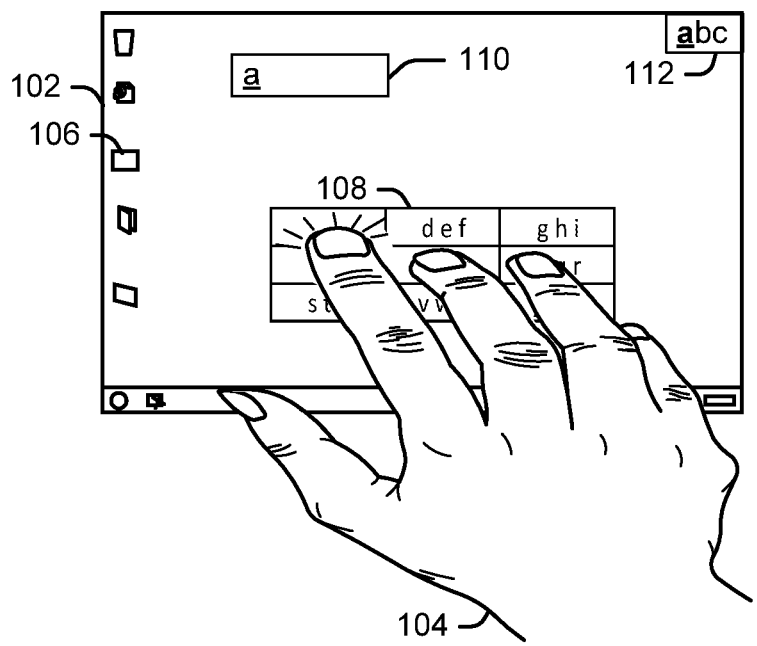
Figure 5:
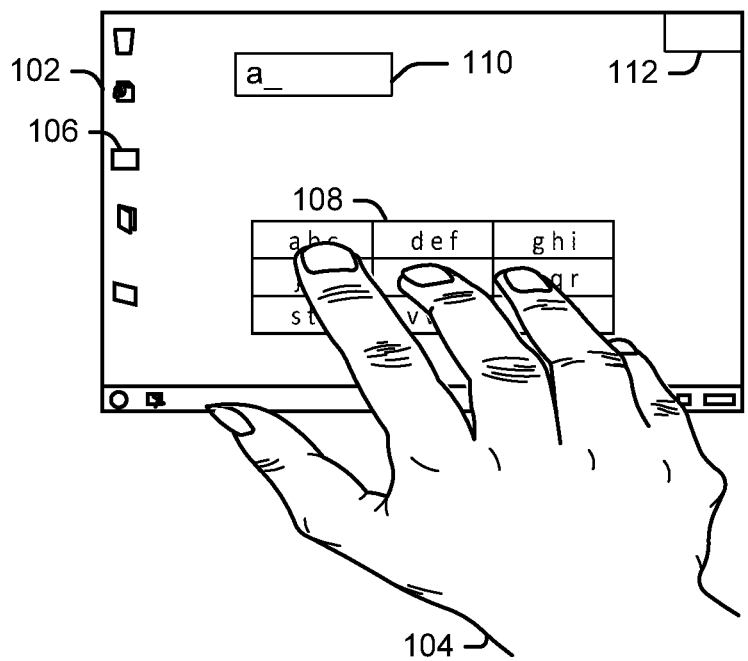

FIGS. 4 and 5 collectively illustrate a first symbol entry implementation. In particular, FIGS. 4 and 5 collectively illustrate a sequence of a user entering the lowercase letter "a" into entered text box 110.

FIG. 4 shows an instance where the user has contacted the top-layer cell of the index finger column of alphabet text entry block 108. This cell includes a subset of the symbols of alphabet text entry block 108, e.g., the letters "a b c." Thus, by placing their index finger on the screen in the top layer, the user has selected this subset of symbols. Also note that the user's middle and ring fingers are not contacting the other cells of alphabet text entry block 108. Furthermore, note that, responsive to the user's contacting the "a b c" cell of alphabet text entry block 108, touch screen 102 can display the letter "a" in entered text box 110. The letter "a" is shown in underline in FIG. 4 to indicate that the letter has not been entered yet, e.g., the cursor is still under letter "a."

Also responsive to the user's touch, hint block 112 can display the selected subset of characters. For example, when the user's index finger makes tactile contact on the top layer of the touch screen, the selected subset "a b c" is displayed in hint block 112. Furthermore, because the user only has one finger contacting touch screen 102 at this time, "a" is the currently-selected letter from the subset, and can be bolded and/or underlined in hint block 112. Note that other techniques, e.g., shading, coloring, font size, etc. can be used to distinguish the currently-selected letter in hint block 112.

FIG. 5 shows an instance where the user has removed their index finger from alphabet text entry block 108. By doing so, the user can enter the letter "a" in entered text box 110. Thus, responsive to the user removing their index finger, entered text box 110 can be updated by moving the cursor to the right of the letter "a," thus indicating that the letter has been entered by the user and they can proceed with entering additional letters. In summary, the examples of FIGS. 4-5 show the user simply touching the "a b c" cell of alphabet text entry block 108 with their index finger and then removing their index finger to enter the lowercase letter "a."

Figure 6:
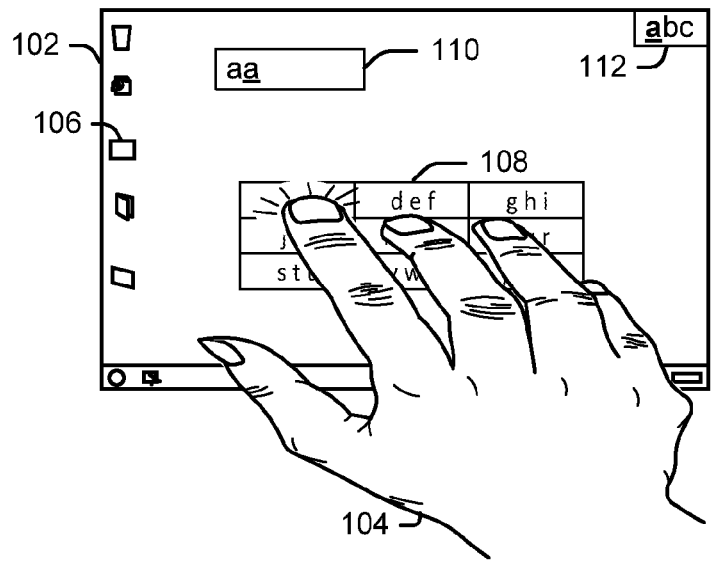
Figure 7:
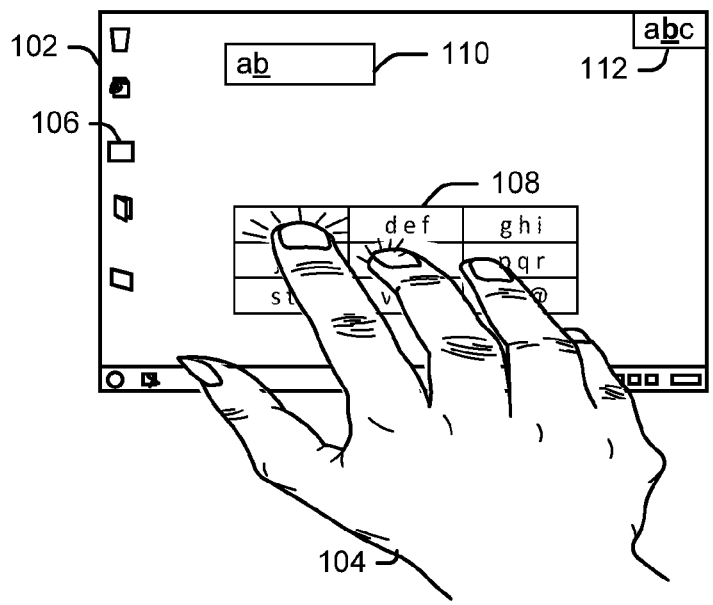
Figure 8:
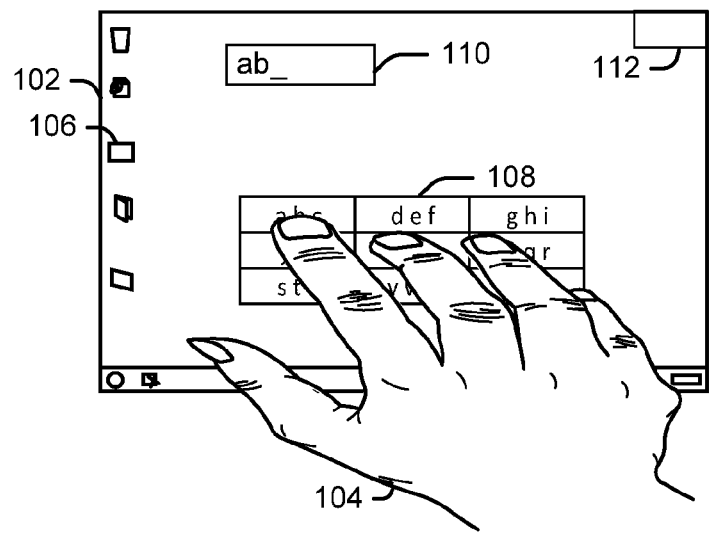

FIGS. 6-8 collectively illustrate a second symbol entry implementation. In particular, FIGS. 6-8 collectively illustrate a sequence of a user entering the lowercase letter "b" into entered text box 110.

FIG. 6 illustrates the user's hand in a similar configuration to that shown in FIG. 4. However, in this example, the user wishes to enter a different letter from the "a b c" cell, e.g., "b." To do so, the user first touches the top layer of alphabet text entry block 108 with their index finger to select the subset of letters "a b c," thus indicating that they wish to enter one of the three letters in the selected subset. Responsive to sensing the user's index finger in the top layer, "a" is shown in FIG. 6 in entered text block 110 with an underline to indicate that "a" is currently selected but not entered yet. Likewise, the selected subset of letters is shown in hint block 112 with the letter "a" underlined and bolded to indicate that "a" is the currently selected letter.

However, instead of removing their index finger as shown previously in FIG. 5, the user can touch any location on touch screen 102 with another finger. For example, as shown in FIG. 7, the user can touch their middle finger to touch screen 102. By adding a second tactile contact to touch screen 102 while their index finger is concurrently touching the top layer, the user can provide an instruction to select the second letter, "b," from the initially-contacted "a b c" subset. Thus, in some implementations, the letter "b" can be displayed in entered text box 110 with the cursor underneath, responsive to the user adding their second finger to touch screen 102. Likewise, in some implementations, hint block 112 can update to show the currently-selected letter "b" in bold and/or underline. Next, as shown in FIG. 8, the user can remove both of their fingers from touch screen 102 to enter the letter "b," move the cursor to the right in entered text block 110, and clear hint block 112.

In some implementations, letters are not entered until the first finger to contact touch screen 102 is removed. In such implementations, the user can toggle between letters of the selected subset by adding and/or removing individual fingers from touch screen 102. For example, while continuing to provide tactile contact with their index finger, the user can add another finger to select the letter "b" (e.g., FIG. 7) and remove the finger to go back to selecting the letter "a" (e.g., FIG. 6). The letter that is currently selected is not entered until the user removes their initial point of tactile contact, i.e., the index finger in this example.

The letter "c" can be entered in a similar procedure as discussed above with respect to FIGS. 6-8. For example, when the user's index finger has touched and still remains in tactile contact of the top layer, both middle and ring fingers touch anywhere on touch screen 102 to select the third letter, i.e., "c" from the subset of "a b c." As mentioned above, as long as the user maintains tactile contact with their index finger, they can add and/or remove fingers to select further letters within the subset. Thus, for example, the user can add both their middle and ring fingers while maintaining contact with their index finger to select the letter "c," and remove one of their middle or ring finger to select "b." The letter that is actually entered is determined by the letter that is selected when the user removes their initial point of contact, e.g., their index finger.

Figure 9:
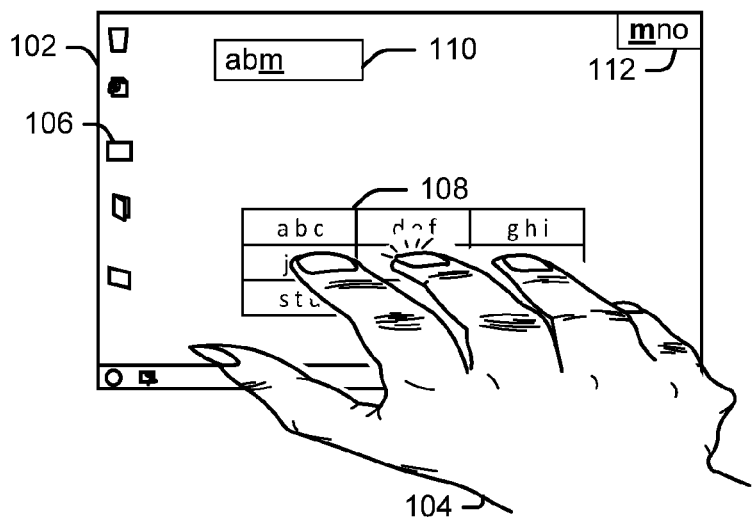
Figure 10:
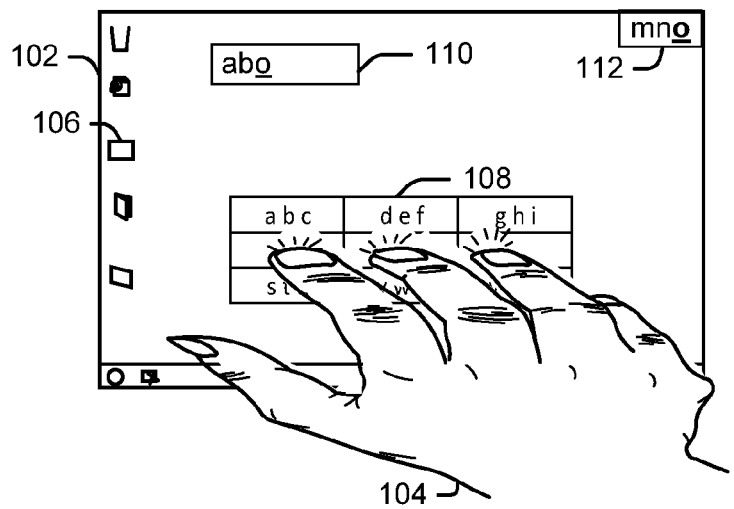
Figure 11:
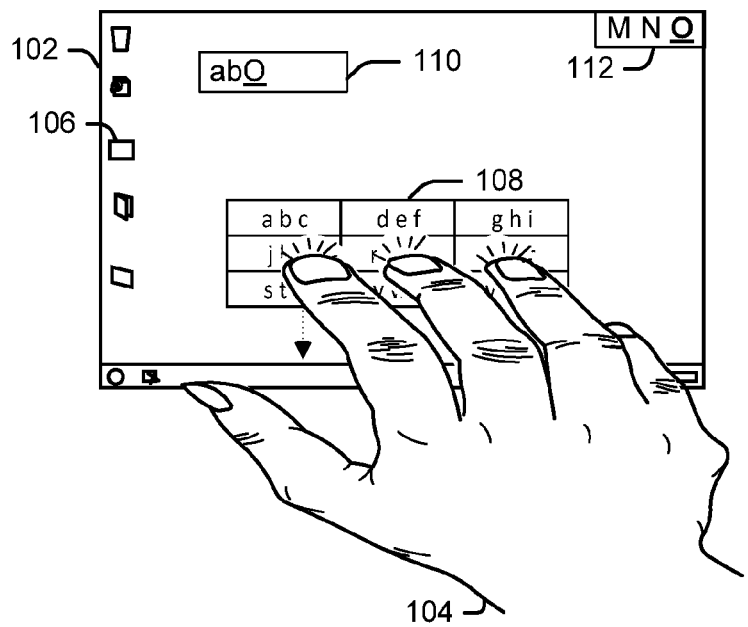

FIGS. 9-11 collectively illustrate a third symbol entry implementation. In particular, FIGS. 9-11 collectively illustrate a sequence of a user entering the capital letter "O" into entered text box 110.

FIG. 9 illustrates the user's hand in a different configuration to that shown in FIG. 4 and FIG. 6. In this example, the user wishes to enter a letter from a different subset, the "m n o" subset. To do so, the user first touches the middle layer with their middle finger to select the "m n o" subset of alphabet text entry block 108 to indicate that they wish to enter one of these three letters. Responsive to detecting the user's middle finger in the middle layer, touch screen 102 can update to show the lowercase letter "m" underlined by the cursor in entered text box 110. Hint block 112 can update to display the selected subset "m n o" with the letter "m" underlined and/or bolded.

Next, the user can touch any two locations of touch screen 102 with two other fingers to provide a total of three points of tactile contact and thereby select the third letter in the cell. For example, as shown in FIG. 10, the user can touch their index finger and their ring finger to touch screen 102. By adding a second and third tactile contact to touch screen 102 while their middle finger is still touching the middle layer, the user can provide an instruction to select the third letter, "o," in the initially-selected "m n o" subset. Accordingly, as shown in FIG. 10, the letter "o" can be displayed in entered text box 110 with the cursor underneath. Hint block 112 can update to bold and/or underline the currently selected letter, "o."

Next, as shown in FIG. 11, the user can provide a shift gesture to select a shifted symbol based on the currently-selected symbol. In the case of a letter, the shifted symbol can be the uppercase version of the selected letter. In such implementations, the shift gesture operates as a capitalization gesture. For other symbols, the shifted symbol can be a different symbol, e.g., the user can shift the "@" symbol to the "©" symbol, as discussed in more detail below with respect to FIGS. 12-14.

In FIG. 11, the user drags their index finger downward as the shift gesture. In some implementations, an upward drag or other gesture is instead used to indicate shifting and/or capitalization. Furthermore, in some implementations, the user can drag a different finger or fingers to provide the shift gesture. In yet other implementations, pressing a button on the device such as by the other hand provides a shift operation. Responsive to the shift gesture, entered text box 110 updates to show the capital letter "O" underlined by the cursor. Correspondingly, hint block 112 displays the capitalized letters from the selected subset, e.g., "M N O" with the letter "O" bolded and/or underlined. If the user removes their fingers from touch screen 102 at this time, this will cause entry of the selected symbol, e.g., capital letter "O" and the cursor will move to the right for entry of another symbol, as already discussed above.

Figure 12:
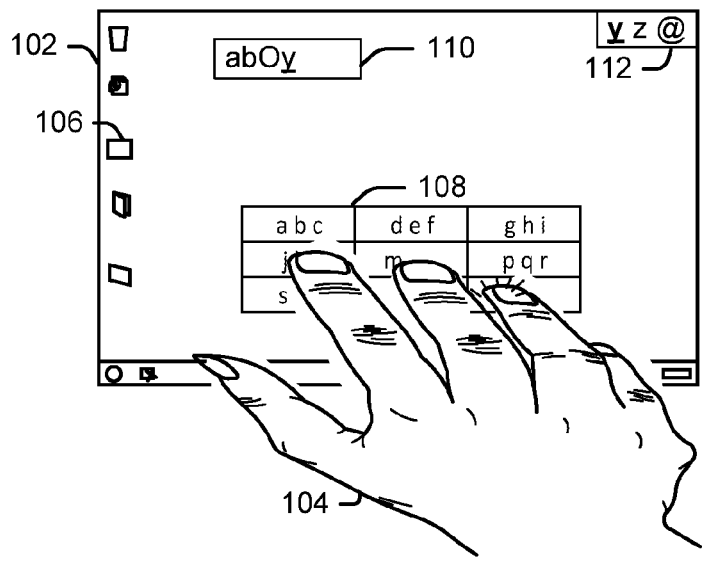
Figure 13:
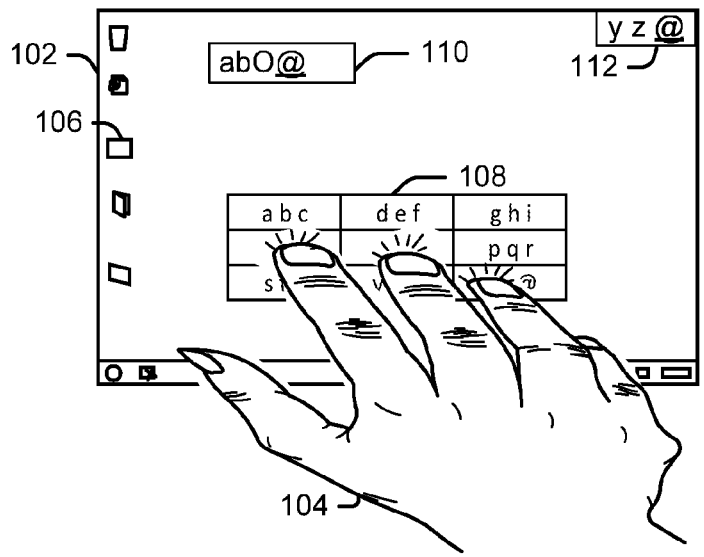
Figure 14:
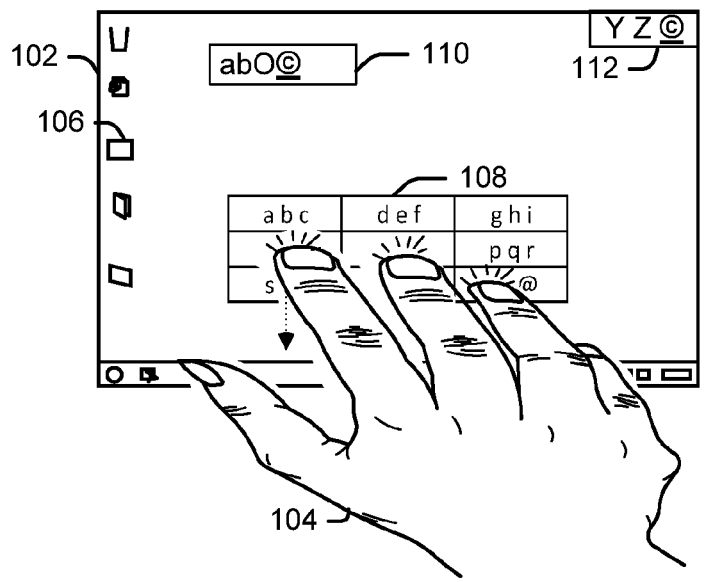

FIGS. 12-14 collectively illustrate a fourth symbol entry implementation. In particular, FIGS. 12-14 collectively illustrate a sequence of a user entering the "©" symbol into entered text box 110.

FIG. 12 illustrates the user contacting the "y z @" subset with their ring finger in the lower layer. Responsive to the user's selection of this subset, touch screen 102 can update to show the lowercase letter "y" underlined by the cursor in entered text box 110. Hint block 112 can update to display the selected subset "y z @" with the letter "y" underlined and/or bolded.

Next, the user can touch any two locations of touch screen 102 with two other fingers to provide a total of three points of tactile contact and thereby select the third symbol from the subset, e.g., the "@" symbol. For example, as shown in FIG. 13, the user can touch their index finger and their middle finger to touch screen 102. By adding a second and third tactile contact to touch screen 102 while their ring finger is still touching the lower layer, the user can provide an instruction to select the third symbol, "@," in the initially-selected "y z @" subset. Accordingly, as shown in FIG. 12, the symbol "@" can be displayed in entered text box 110 with the cursor underneath. Hint block 112 can update to bold and/or underline the currently selected symbol, "@."

Next, as shown in FIG. 14, the user can provide a shift gesture to select a shifted symbol based on the currently-selected symbol. As mentioned above, the shifted symbol for the "@" symbol can be the "©" symbol. In FIG. 14, the user drags their index finger downward as the shift gesture, and, responsive to the shift gesture, entered text box 110 updates to show the shifted "©" symbol underlined by the cursor. Correspondingly, hint block 112 displays the shifted symbols from the selected subset, e.g., "Y Z ©" with the symbol "©" bolded and/or underlined. If the user removes their fingers from touch screen 102 at this time, this will cause entry of the selected "©" symbol and the cursor will move to the right for entry of another symbol, as already discussed above.

Figure 15:
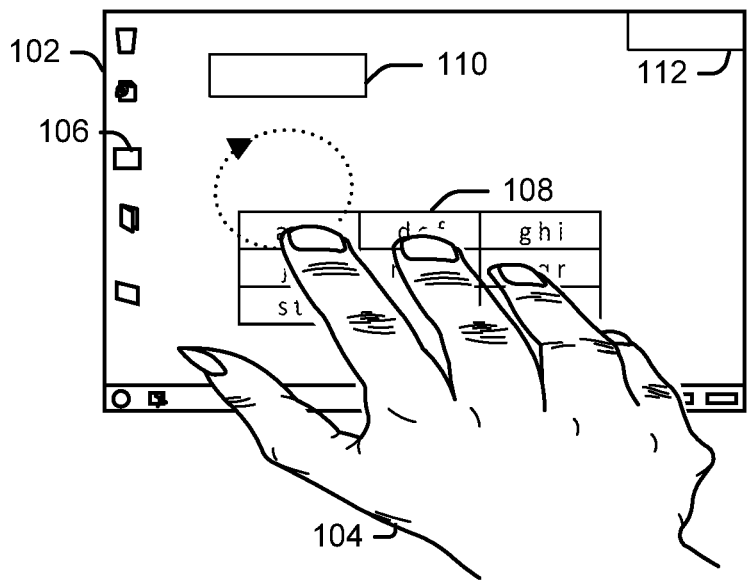
Figure 16:
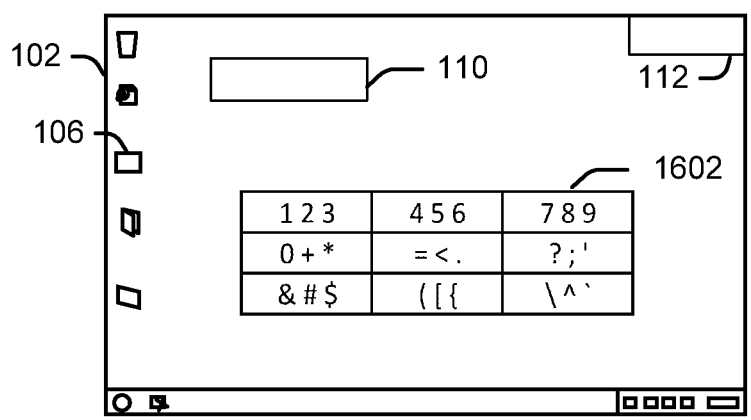

FIGS. 15 and 16 collectively illustrate a mode switch implementation. FIG. 15 illustrates the user's hand providing a mode switch gesture, e.g., a clockwise rotation ("swirl") of their index finger while touch screen 102 is displaying alphabet text entry block 108. Responsive to the mode switch gesture, touch screen 102 can display a second symbol entry block such as numeric and punctuation text entry block 1602, shown in FIG. 16. Generally speaking, the user can enter numbers and symbols from the various cells of numeric and punctuation text entry block 1602 in a manner similar to that discussed above with respect to alphabet text entry block 108. Note that while FIG. 15 shows the mode switch gesture with the user's index finger, the user can use other fingers to provide the mode switch gesture.

In some implementations, the user can provide a mode switch-down gesture with a clockwise rotation or mode switch-up gesture with an anti-clockwise rotation. This can be particularly useful when there are more than two modes, e.g., multiple modes for non-alphabetical symbols. A mode switch-down gesture can be used to select and enter the next input mode while a mode switch-up gesture can be used to select and enter the previous mode. Modes can be circularly ordered such that the next mode is selected and entered with a mode switch-down gesture if the current mode is not the last mode in the list of the modes. If the current mode is the last mode, a mode switch-down gesture can cause selecting and entering the first mode. Similarly, the previous mode can be selected and entered with a mode switch-up gesture if the current mode is not the first mode in the list of the modes. If the current mode is the first mode, a mode switch-up gesture can select and enter the last mode.

Note that the above discussion includes examples where three points of tactile contact are provided to touch screen 102 for different reasons, e.g., as a launch gesture in some instances or to select a third symbol from a cell in other instances. These two examples can be distinguished in several ways. First, in the example of FIG. 3 showing a launch gesture, alphabet text entry block 108 has not yet been launched in touch screen 102. Thus, the three points of contact can be interpreted as a launch gesture in instances when alphabet text entry block 108 is not yet launched. In instances when alphabet text entry block 108 is already launched, e.g., FIG. 9-11 showing entry of the letter "O", the three points of contact can be interpreted as selecting an individual symbol from alphabet text entry block 108. In other implementations, different gestures can be used to switch on or off text entry modes by launching or removing a text entry block such as alphabet text entry block 108. For example, the user can touch three or more fingers to the screen concurrently and then move the fingers together to launch a text entry block. The user can use an opposite gesture, e.g., touching three or more fingers concurrently and then moving the fingers apart to remove alphabet text entry block 108.

In some implementations, these examples can also be distinguished based on the amount of time between individual tactile points of contact. In the example of FIG. 3, the launch gesture can correspond to the user contacting touch screen 102 with three points of contact relatively simultaneously. In the example of FIG. 10, the selection of the letter "o" can be thought of as the user providing the three points of contact at least partially in a sequence, e.g., the user first selecting cell "m n o" with their middle finger and then subsequently providing the additional two points of contact to choose the letter "o." Thus, in FIG. 10, the index and ring fingers exhibit concurrent contact with touch screen 102, but the contact is sequential rather than simultaneous with the initial contact by the middle finger.

Touch screen 102 can be configured to distinguish between simultaneous and sequential yet concurrent points of contact by applying a time threshold. For example, points of contact that are detected within 50 milliseconds or less of one another can generally be considered as simultaneous. In contrast, points of contact that are not detected within the threshold, e.g., greater than 50 milliseconds, can be considered as sequential points of contact. In some implementations, the threshold can be user-adjustable.

Referring back to FIGS. 2 and 3, in some instances, touch screen 102 can display alphabet text entry block 108 in a location that is at least partially defined by the launch gesture. For example, if the user enters a launch gesture in the center of touch screen 102, alphabet text entry block 108 can be displayed in the center of touch screen 102. Likewise, if the launch gesture is detected offset from the center of touch screen 102, alphabet text entry block 108 can be displayed in a corresponding location, e.g., up, down, left, or right depending on where the launch gesture is detected. In some implementations, the user is prompted to enter the launch gesture and a corresponding calibration is performed to determine the location of alphabet text entry block 108 and the locations of the layers and fingers at that time. In further implementations, symbols are not displayed on touch screen 102 as illustrated in alphabet text entry block 108. Rather, designated locations for the user's fingers and the corresponding layers can be indicated without the corresponding symbols. The locations can be marked by color and/or shape to guide the user to indicate which finger corresponds to various locations on touch screen 102.

In further implementations, alphabet text entry block 108 and/or numeric and punctuation text entry block 1602 can have their positions on touch screen 102 continually calibrated as the user enters text. For example, if the user's fingers tend to "walk" in a particular direction, the location of blocks 108/1602 can "walk" in the same direction as, and proportionally to, the user's fingers. This can be implemented, for example, by comparing the resulting entered symbol, after correction if needed, with the individual contacts of the cells of blocks 108/1602 that entered the symbol. This provides the current contact locations of the fingers used, which can be recorded to determine an expected location for the fingers. A weighted average mechanism can be applied to the previous recorded locations of a finger at the same layer to calculate an updated expected location of the finger. This location can be considered as the center of the contact region of that finger for the layer. Blocks 108/1602 can be thus adjusted accordingly to maintain blocks 108/1602 by following the gradual movement of the user's fingers.

Some implementations use different numbers of cells and/or fingers from the examples shown above. For example, a launch gesture could include four concurrent points of contact that are received within a threshold period of time. As another example, blocks 108 and/or 1602 can include more or less than the three rows and columns shown above. It can be useful for the number of columns to correspond to the number of fingers the user is expected to use for symbol entry, e.g., one column per finger. However, other implementations allow for individual fingers to be assigned to multiple columns, e.g., using horizontal as well as vertical movement to select a cell of block 108/1602.

Note also that in some implementations symbol entry blocks 108 and/or 1602 can be omitted. While they can serve as a useful guide to the finger codings described herein, it can generally be the identity of the user's one or more fingers that contact the touch screen rather than the location of the contact that is used to select individual symbols. For example, the user's fingerprints and/or the relative distances to the specified or expected locations of fingers can be used to distinguish between individual fingers. Each finger has a different fingerprint, which can be used to identify a finger that is in tactile contact with a touch screen. Alternatively, when a finger touches the touch screen, the distances of the tactile contact location of a finger to expected locations of the fingers can be calculated. This can be performed after registration and tracking of the locations of the fingers that will be used in entering symbols. If the shortest distance is smaller than a threshold, the finger in tactile contact can be identified as the finger which has the shortest distance. Additionally, the sequence of touches and also finger gestures can also be used to code symbols.

Additional Three-Finger Codings

The description above provides several examples of how various finger gestures and combinations of fingers in tactile contact with a touch screen can be used to enter symbols by a user. The following presents additional functionality that can be employed for entering symbols via touch screen 102.

As mentioned above, the downward-dragging of one or more fingers can be used to indicate a shift gesture. Dragging of one or more fingers can also be used to implement other entries for entered text block 110, e.g., backspacing, enter (corresponding to carriage return and/or line feed), spaces, etc. A rightward drag of any finger can be used to indicate a space. A leftward drag can be used to indicate a backspace. A down then left drag by a finger can be used as an enter gesture. Note that the down and left motion can be distinguished from separate down and then left gestures (e.g., shift then backspace) because the user's finger will generally maintain contact with touch screen 102 when performing the enter gesture, whereas the finger will generally stop contacting touch screen 102 in between the shift and backspace gestures.

As mentioned above, some symbols may have corresponding shifted symbols that can be selected and/or entered via a shift gesture. The following table illustrates numeric and punctuation text entry block 1602 with the shifted characters in parenthesis. Note that the bottom layer for the middle finger uses quotes to indicate literal parenthesis and unquoted parenthesis to indicate shifted characters. Commas are used to separate the symbols that are selected by concurrent contact of one, two, and three fingers.

| Finger | Index (I) | Middle (M) | Ring (R) |
|---|---|---|---|
| Top Layer | 1, 2, 3 | 4, 5, 6 | 7, 8, 9 |
| Middle Layer | 0, +(−), *(/) | =(%), <(>), .(,) | ?(!), ;(:), '(") |
| Bottom Layer | &, #, $ | "("(")"), [(]), {(}) | \(\|), ^(_), `(~) |

Example Five Finger Scheme

In some implementations, five fingers of one hand can be used to code symbols and commands for input to touch screen 102. Such implementations may be more suitable for devices with larger touch screens whereas the three-finger implementations may be more suitable for devices with smaller touch screens. In the five finger scheme discussed below, the index, middle, ring, and pinky fingers can each have two possible positions, an upper layer position and a lower layer position. The thumb can operate in a single layer.

As mentioned above with respect to the three finger scheme, certain gestures can be used for symbols or commands such as space, shift, return, backspace, and/or enter. In this example, some of these gestures are performed by the thumb. For example, the user can enter a space by simply touching their thumb to touch screen 102. The thumb can also be used in conjunction with one or more other fingers to perform a shift operation. For example, the user can select a character with one or more of their other fingers and then concurrently touch the screen with their thumb to select the shifted character. The user can also maintain their thumb in contact with the touch screen to enter several shifted characters, e.g., capitalized letters, in sequence. Backspaces can be implemented by the user dragging their thumb or other fingers to the left, delete operations can be performed by dragging the thumb or other fingers to the right, and the thumb or other fingers can be dragged downward to perform an enter operation.

Generally speaking, the five finger implementation discussed herein operates similarly to the three finger implementation discussed above. However, different codings can be used for individual symbols, and, in some cases, relatively simultaneous finger contacts can be used to select a symbol. Example codings are shown below.

For the purposes of this example, eight groups of letters are defined as set forth in the following table. Each group is represented by the letter that is coded by the touch of a single finger:

| Finger | Index (I) | Middle (M) | Ring (R) | Little (L) |
|---|---|---|---|---|
| Upper Layer | e (E) | i (I) | o (O) | w (W) |
| Lower Layer | a (A) | r (R) | m (M) | l (L) |

The following table illustrates an "e" group, e.g., each of the following letters is coded with the index finger in the upper layer. This group includes a subset of the symbols that can be entered via the touch screen, e.g., both the small and capital letters of e, f, g, h, u, v, and q. For the purposes of the following tables, "+" can mean simultaneous and/or concurrent touches of touch screen 102. The index, middle, ring, and little fingers are designated as "I," "M," "R" and "L," respectively.

| | Character | Codeword | Character | Codeword |
|---|---|---|---|---|
| e-Group (Upper Layer) | e (E) | I | u (U) | I + R |
| | f (F) | I + M | v (V) | I + R + L |
| | g (G) | I + M + R | q (Q) | I + L |
| | h (H) | I + M + R + L | | |

Thus, to enter the lowercase letter "e," the user simply touches their index finger to the upper layer. To enter an uppercase "E," the user can touch their index finger in the upper layer and also touch their thumb to perform the shift operation. More generally, as mentioned above, shifted characters are shown in parenthesis in the tables presented herein. As another example, the code for the letter "f" is the index and middle fingers with both fingers in the upper layer. To enter the uppercase letter "F," the user can touch the screen with their thumb, index, and middle fingers simultaneously and/or concurrently. As mentioned above, if the thumb touches the screen without any other fingers, this enters a blank space.

The following table illustrates an "a" group, e.g., each of the following letters can be coded with the index finger in the lower layer. This group includes a different subset of the symbols that can be entered via the touch screen, e.g., the small and capital letters of a, b, c, d, and x, y, and z.

| | Character | Codeword | Character | Codeword |
|---|---|---|---|---|
| a-Group (Lower Layer) | a (A) | I | x (X) | I + R |
| | b (B) | I + M | y (Y) | I + R + L |
| | c (C) | I + M + R | z (Z) | I + L |
| | d (D) | I + M + R + L | | |

Letters from the "a" group can be entered in a manner similar to that set forth above with respect to the "e" group. For example, the user can touch and remove their index finger from the lower layer to select and enter the lowercase letter "a." To enter the lowercase letter "d," the user touches all four fingers except for the thumb to touch screen 102 in the lower level.

The following table illustrates an "i" group, which can include both the small and capital letters of i, j and k.

| | Character | Codeword |
|---|---|---|
| i-Group (Upper Layer) | i (I) | M |
| | j (J) | M + R |
| | k (K) | M + R + L |

Note that each character in the "i" group is coded without using the index finger. This can be used to distinguish these codings from those set forth above for the "e" and "a" groups.

The following table illustrates an "r" group, which can include both the small and capital letters of r, s, and t.

| | Character | Codeword |
|---|---|---|
| r-Group (Lower Layer) | r (R) | M |
| | s (S) | M + R |
| | t (T) | M + R + L |

The following table illustrates an "o" group, which can include both the small and capital letters of o and p:

| | Character | Codeword |
|---|---|---|
| o-Group (Upper Layer) | o (O) | R |
| | p (P) | R + L |

The following table illustrates an "m" group, which can include both the small and capital letters of m and n.

| | Character | Codeword |
|---|---|---|
| m-Group (Lower Layer) | m (M) | R |
| | n (N) | R + L |

Note that the letters w/W and I/L are indicated by the user's little finger in the upper and lower levels, respectively. Because the index, middle, and ring fingers are not used for these letters, no other codings are provided with the exception of shifting with the thumb as discussed above for capitalization purposes.

The five finger scheme presented herein also provides a mode that allows for entry of numbers and other non-alphabetical symbols. These symbols can also be divided into groups in a manner similar to that discussed above, so that each group is represented by the symbol that is selected by single finger touch. The following table shows the groups, e.g., 1, 5, 8, 0, ?, (, &, and \.

| Finger | Index (I) | Middle (M) | Ring (R) | Little (L) |
|---|---|---|---|---|
| Upper Layer | 1 | 5 | 8 | 0 |
| Lower Layer | ? | ( | & | \ |

The following table illustrates a "1" group, which can include the numbers 1, 2, 3, 4 and operators +, −, *, /.

| | Character | Codeword |
|---|---|---|
| 1-Group (Upper Layer) | 1 (+) | I |
| | 2 (−) | I + M |
| | 3 (*) | I + M + R |
| | 4 (/) | I + M + R + L |

The following table illustrates a "?" group, which can include the symbols "?", "!", ";", ":", "'", """, "'", " ", "_", "~".

| | Character | Codeword | Character | Codeword |
|---|---|---|---|---|
| "?"-Group (Lower Layer) | ? (!) | I | ` (~) | I + R + L |
| | ; (:) | I + M | | |
| | ' (") | I + M + R | | |
| | ^ (_) | I + M + R + L | | |

The following table illustrates a "5" group, which can include the symbols 5, 6, 7 and =, "<", ">".

| | Character | Codeword |
|---|---|---|
| 5-Group (Upper Layer) | 5 (=) | M |
| | 6 (<) | M + R |
| | 7 (>) | M + R + L |

The following table illustrates a "(" group, which can include the symbols "(", ")", "[", "]", "{", and "}".

| | Character | Codeword |
|---|---|---|
| "("-Group (Lower Layer) | "(" (")") | M |
| | [ (]) | M + R |
| | { (}) | M + R + L |

The following table illustrates an "8" group, which can include the symbols 8, 9, ".", and ",".

| | Character | Codeword |
|---|---|---|
| 8-Group (Upper Layer) | 8 (.) | R |
| | 9 (,) | R + L |

The following table illustrates an "&" group, which can include the symbols "&", "#", "@", and "$".

| | Character | Codeword |
|---|---|---|
| &-Group (Lower Layer) | & (#) | R |
| | @ ($) | R + L |

A "0" group can include 0 and a shifted symbol "%," coded by the little finger at the upper layer. A "\" group can include backslash and a vertical line "|" by shifting, both coded with the little finger at the lower level.

Note that, in some implementations, the shifted characters can instead be taken from a standard keyboard, e.g., 1 (!), 2 (@), etc. This coding can have the advantage that a user familiar with the keyboard may easily recall shifted characters.

Figure 17:
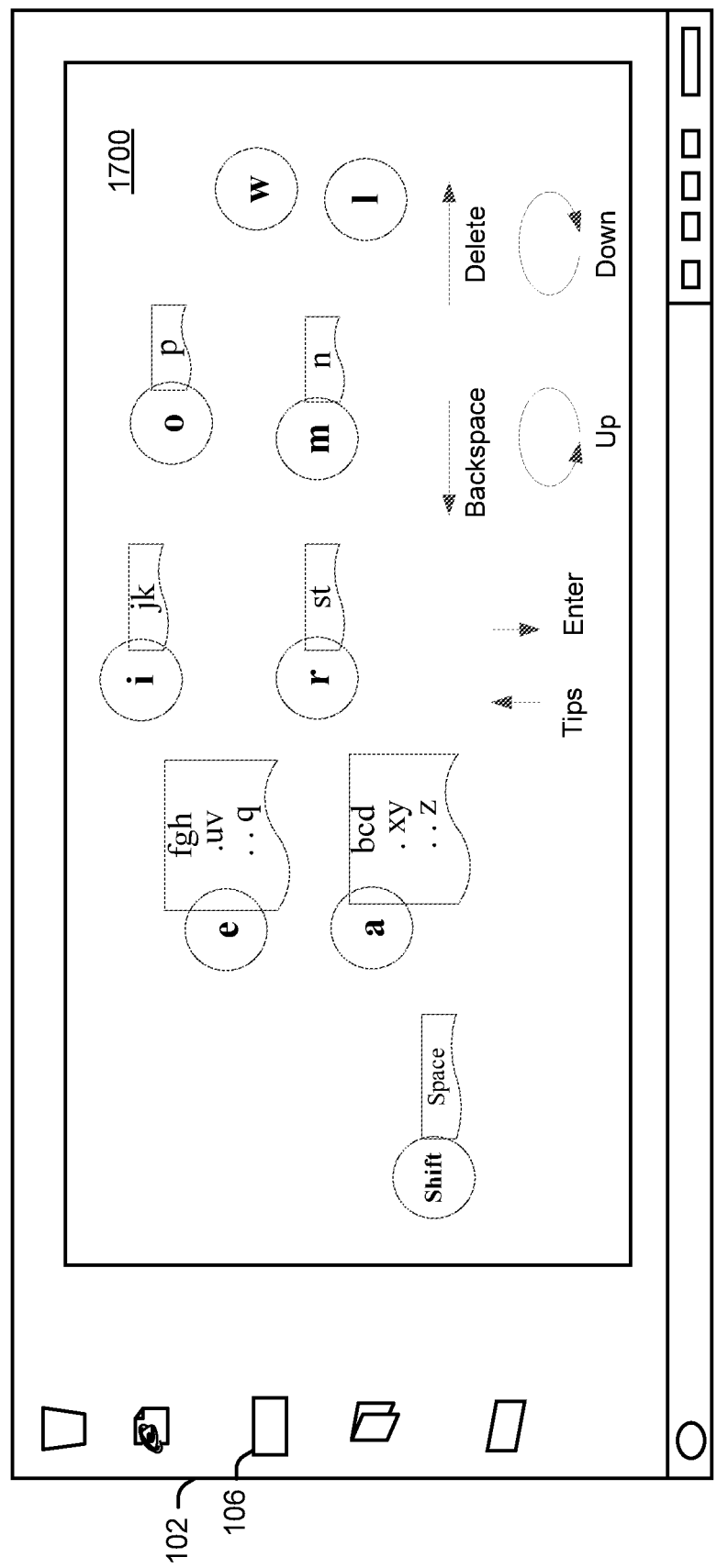

In some implementations, users can also view a helpful layout of the codings for individual symbols. FIG. 17 illustrates an exemplary informational layout 1700 that can be presented to the user responsive to a tips gesture such as an upward drag of a finger. As shown in FIG. 17, the codings can be displayed so that letters from a given group are shown together, e.g., the "e" group is shown with the letters f, g, h, u, v, and q. Furthermore, note that the letters in the group are horizontally displaced in correspondence with the other fingers that are used to select them. Similar layouts can be displayed for the three finger coding scheme discussed above, as well as for different modes such as for entry of numbers.

Example Operating Environment

FIG. 18 references a computing system 1800 that includes a contact detection device 1802. The contact detection device can include a touch sensitive display screen (e.g. touch screen) 1804. The touch screen 1804 can include some type of contact detectors interspersed on or underneath the touch screen itself, e.g., resistive, capacitive, optical, and/or mechanical contact detectors. The touch screen can also include a symbol entry block 1806. In this case, the touch screen can be activated by the digits of a user's hand 1808.

A geometry tracking module 1810 can track the contact of the user's fingers and their relative states (i.e. activated or inactivated) and actions (e.g., drag to the left) on touch screen 1804. Geometry tracking module 1810 can alternatively, or additionally, track various content displayed on the touch screen such as graphical windows, icons, etc. For instance, the geometry tracking module may track the user's fingers and or content via a plane defined by the illustrated x and y axes.

User input detected by touch screen 1804, e.g., the location, movement, and/or pressure of the user's fingers, can be sent to a finger identifying module 1812 either directly or via geometry tracking module 1810. The finger identifying module 1812 can analyze the user input utilizing various parameters to identify whether the input is a keyboard launch gesture, symbol selecting gesture, mode switch gesture, capitalization gesture, etc. The finger identifying module 1812 can communicate symbols to an application 1814 based upon the analyzed contact gestures as described above and below.

Examples of parameters that can be utilized by the finger identifying module 1812 can include relative distances to the desirable locations of the fingers to identify a finger that is in tactile contact with a touch screen, the number of fingers contacting the touch screen concurrently, an order in which fingers contact and/or are removed from the touch screen, and a duration of the contact of each finger. These parameters can be used to determine a symbol to enter when cells of symbol entry blocks are activated. In some implementations, finger identifying module 1812 identifies individual fingers by fingerprint, e.g., by referencing a library of example fingerprints for the user or other users. In other implementations, finger identifying module 1812 uses the relative location and/or size of the individual tactile contacts to determine which of the user's fingers is contacting touch screen 1804. In some implementations, finger identifying module 1812 determines (1) an identity of the first finger to touch the touch screen (e.g., index, middle, ring, etc.); (2) an identify of a subsequent finger to touch the touch screen, either simultaneously or sequentially with the first finger; and/or (3) a number of other fingers that touch the touch screen after the first finger, but not the identity of these other fingers.

For example, some implementations may use parameter algorithms that can distinguish between the user's fingers and thumb. In one case, the contact from the fingers of one hand can be distinguished in that they tend to be clustered together. In contrast, contact from the thumb tends to be relatively more distal from the cluster. Additionally, the finger identifying module can record the locations of fingers during registration and can track these locations when a user enters symbols. When a finger touches the screen, distances of the tactile location to the specified locations of fingers can be calculated and compared. The finger that gives the shortest distance, if that distance is smaller than a threshold distance, can be identified as the finger which touches the screen. Other implementations can detect contact from both hands. The contact from the user's pair of hands can be analyzed together or divided into a set for the left hand and a set for the right hand. Similar techniques can be used to distinguish fingers from one another, e.g., in conjunction with the calibration mechanism mentioned above. For example, once the user touches the screen once with several or all of their fingers concurrently or sequentially during registration or calibration, the relative location of subsequent touches to the specified locations of the fingers can be used to infer which fingers are contacting the touch screen.

Various systems and devices may benefit from the contact detection device, such as media players, remote controls, smart phones, personal digital assistants, personal audio devices, global positioning systems, Internet appliances, wireless connectivity devices, vehicle control systems, vehicle entertainment systems, tablet computers, laptop computers, stand-alone input and/or output devices, and the like. Note that the contact detection device can comprise or have access to computer-readable storage media on which various applications, software, or other executable instructions may be stored.

In some embodiments, the contact detection device is operating system (OS) specific. When the contact detection device is OS specific, the contact detection device provides functions that are specific to the OS and various applications (e.g., the application) configured for use with the OS. In other embodiments, the contact detection device is configured for a specific application. The OS or a module within the OS may act as an intermediary between the contact detection device and the application.

Generally, any of the functions described herein can be implemented using software, firmware, hardware (e.g., fixed-logic circuitry), manual processing, or a combination of these implementations. The terms "tool" or "tools" and "module" or "modules" as used herein generally represent software, firmware, hardware, whole devices or networks, or a combination thereof. In the case of a software implementation, for instance, these may represent program code that performs specified tasks when executed on a processor (e.g., CPU or CPUs).

The program code can be stored in one or more computer-readable memory devices, such as computer-readable storage media. As used herein, the term "computer-readable media" can include transitory and non-transitory instructions. In contrast, the term "computer-readable storage media" excludes transitory instances, and includes volatile or non-volatile storage devices such as random access memory, optical disks, hard drives, flash drives, etc. The features and techniques of the tools and modules can be platform-independent, meaning that they may be implemented on a variety of commercial computing platforms having a variety of processors.

Example Techniques

The following discussion describes various symbol entry control techniques, methods, and procedures, which may be implemented in hardware, firmware, software, or a combination thereof. The methods are shown as a set of blocks that specify operations performed by one or more entities, devices, modules, and/or the tools, such as finger identifying module 1812 of FIG. 18, and are not necessarily limited to the orders shown for performing the operations by the respective blocks. Further, the methods can be completed by other entities than those in the described devices/systems. A variety of other examples and sub-techniques are also contemplated.

FIG. 19 depicts a symbol selection method 1900.

Block 1902 identifies a first finger in tactile contact with a touch screen. The first finger can be identified as a thumb, index finger, middle, ring, little finger, etc. The first finger can identify a subset of symbols.

Block 1904 identifies whether one or more other fingers are in concurrent contact with the first finger on the touch screen. Note that in some implementations the one or more other fingers are not identified as particular fingers, e.g., index, middle, etc. Rather, it can be sufficient to identify whether the other fingers are touching the touch screen and/or a number of such fingers without identifying the particular fingers that are doing so.

Block 1906 selects an individual symbol from the subset of symbols based on whether the other fingers are in concurrent tactile contact. For example, different symbols from the subset can be selected based on the number of concurrent tactile contacts.

FIG. 20 depicts a symbol shifting method 2000.

Block 2002 identifies a finger that is in tactile contact with a touch screen.

Block 2004 selects an individual symbol based on the identified finger.

Block 2006 changes the symbol responsive to a shift gesture that can be received after the symbol is selected.

Conclusion

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system comprising:
   a touch screen;
   one or more processing devices; and
   one or more computer-readable storage media comprising computer-executable instructions that, when executed by one or more processing devices, cause the one or more processing devices to:
   identify a finger that is in tactile contact with the touch screen;
   select an individual symbol from a plurality of symbols based on the identified finger;
   after the individual symbol is selected, determine whether another finger that comes into tactile contact with the touch screen concurrently with the finger is a thumb or a different finger;
   in first instances when the another finger is not the thumb, change the individual symbol to another individual symbol from the plurality of symbols; and
   in second instances when the another finger is the thumb, change the individual symbol to a corresponding capitalized symbol.

2. The computing system according to claim 1, wherein the computer-executable instructions cause the one or more processing devices to:
   while the thumb remains in contact with the touch screen, select a series of several other capitalized symbols corresponding to other symbols selected by other fingers that contact the touch screen.

3. The computing system according to claim 1, wherein the computer-executable instructions cause the one or more processing devices to:
   detect a rightward drag of the thumb on the touch screen; and
   responsive to the rightward drag of the thumb on the touch screen, performing a delete operation of the individual symbol.

4. The computing system according to claim 1, wherein the computer-executable instructions cause the one or more processing devices to:
   detect a leftward drag of the thumb on the touch screen; and
   responsive to the leftward drag of the thumb on the touch screen, performing a backspace operation over the individual symbol.

5. The computing system according to claim 1, wherein the computer-executable instructions cause the one or more processing devices to:
   in the first instances, enter the another individual symbol responsive to detecting that the finger and the another finger have been removed from the touch screen; and
   in the second instances, enter the corresponding capitalized symbol responsive to detecting that the finger and the thumb have been removed from the touch screen.

6. The computing system according to claim 1, wherein the computer-executable instructions cause the one or more processing devices to:
   determine whether the another finger is the thumb by:
   identifying a cluster of contacts on the touch screen, and
   determining that another contact by the thumb is relatively distal from the cluster.

7. The computing system according to claim 1, wherein the computer-executable instructions cause the one or more processing devices to:
   determine whether the another finger is the thumb by evaluating a fingerprint of the another finger.

8. The computing system according to claim 1, wherein the computer-executable instructions cause the one or more processing devices to:
   perform a registration or calibration operation to determine a specified location of the thumb; and
   determine whether the another finger is the thumb based on a relationship between the specified location of the thumb and another location where the another finger contacts the touch screen.

9. The computing system according to claim 1, embodied as a smart phone, tablet, or laptop.

10. A method performed by a computer processing unit, the method comprising:
    determining an identity of a finger that is in tactile contact with a touch screen;
    selecting an individual symbol from a plurality of symbols based on the identity of the finger;
    after the individual symbol is selected, determining whether another finger that comes into tactile contact with the touch screen concurrently with the finger is a thumb or a different finger;
    in first instances when the another finger is not the thumb, change the individual symbol to another individual symbol from the plurality of symbols; and
    in second instances when the another finger is the thumb, change the individual symbol to a corresponding capitalized symbol.

11. The method of claim 10, wherein the plurality of symbols include a first subset of symbols and a second subset of symbols, wherein the first subset of symbols is designated by contact of an index finger with the touch screen, the second subset of symbols is designated by contact of a middle finger and not the index finger with the touch screen, and the first subset of symbols does not share symbols with the second subset of symbols.

12. The method of claim 11, further comprising:
    when the identity is the index finger, selecting the individual symbol from the first subset; and
    when the identity is the middle finger and the index finger is not in tactile contact with the touch screen, selecting the individual symbol from the second subset.

13. The method of claim 12, further comprising:
    in the first instances and when the identity is the index finger, selecting the another individual symbol from the first subset based on the another identity of the another finger, the another identity being from a group comprising a middle finger, a ring finger, and a little finger.

14. The method of claim 13, further comprising:

in the first instances and when the identity is the middle finger and the index finger is not in tactile contact with the touch screen, selecting the another individual symbol from the second subset based on the another identity of the another finger.

15. A hardware computer-readable storage media storing instructions which, when executed by a computer processing unit, cause the computer processing unit to perform acts comprising:

determining an identity of an individual finger that is in tactile contact with a touch screen;

selecting an individual symbol from a plurality of symbols based on the identity of the individual finger;

after the individual symbol is selected, determining another identity of another individual finger that comes into tactile contact with the touch screen concurrently with the individual finger, the another identity being one of a thumb, an index finger, a middle finger, a ring finger, or a little finger;

in first instances when the another identity is not the thumb, change the individual symbol to another individual symbol from the plurality of symbols; and in second instances when the another identity is the thumb, change the individual symbol to a corresponding capitalized symbol.

16. The hardware computer-readable storage media of claim 15, the acts further comprising:

selecting the individual symbol, the another individual symbol, and the corresponding capitalized symbol from a plurality of subsets of symbols based on the identity of the individual finger, the plurality of subsets including at least a first subset of symbols, a second subset of symbols, a third subset of symbols, and a fourth subset of symbols.

17. The hardware computer-readable storage media of claim 16, the acts further comprising:

in the first instances:

when the identity is the index finger, selecting the individual symbol and the another individual symbol from the first subset or the second subset, and when the identity is the middle finger and the index finger is not contacting the touch screen, selecting the individual symbol and the another individual symbol from the third subset or the fourth subset.

18. The hardware computer-readable storage media of claim 17, the acts further comprising:

in the first instances and when the identity is the index finger:

selecting the individual symbol and the another individual symbol from the first subset when the index finger is in contact with an upper layer that identifies the first subset, and selecting the individual symbol and the another individual symbol from the second subset when the index finger is in contact with a lower layer that identifies the second subset.

19. The hardware computer-readable storage media of claim 18, the acts further comprising:

in the first instances and when the identity is the middle finger and the index finger is not contacting the touch screen:

selecting the individual symbol and the another individual symbol from the third subset when the middle finger is in contact with upper layer that identifies the third subset, and selecting the individual symbol and the another individual symbol from the fourth subset when the middle finger is in contact with a lower layer that identifies the fourth subset.

20. The hardware computer-readable storage media of claim 19, wherein the first subset, the second subset, the third subset, and the fourth subset share no common symbols.

* * * * *